United States Patent [19]

Kittrell et al.

[11] Patent Number: 5,189,122
[45] Date of Patent: Feb. 23, 1993

[54] PROCESS FOR THE PREPARATION OF COPOLYMERS OF MALEIC ANHYDRIDE AND ALKYL VINYL ETHER

[75] Inventors: James R. Kittrell; Charles W. Quinlan, both of Amherst, Mass.

[73] Assignee: KSE Inc., Sunderland, Mass.

[21] Appl. No.: 912,743

[22] Filed: Jul. 13, 1992

[51] Int. Cl.$^5$ ................................................ C08F 2/00
[52] U.S. Cl. ...................................... 526/77; 526/271; 526/332
[58] Field of Search ......................... 526/77, 271, 332; 585/820

[56] References Cited

U.S. PATENT DOCUMENTS 4,962,185 10/1990 Tazi et al. ............................. 526/271
5,012,037 4/1991 Doshi et al. ........................... 585/520

Primary Examiner—Joseph L. Schofer
Assistant Examiner—David Wu
Attorney, Agent, or Firm—Bachman & LaPointe

[57] ABSTRACT

A copolymer of maleic anhydride and an alkyl vinyl ether is prepared with substantially reduced benzene content by first contacting the alkyl vinyl ether with activated charcoal and then reacting together the charcoal treated alkyl vinyl ether and maleic anhydride in the presence of a free radical initiator.

20 Claims, No Drawings

PROCESS FOR THE PREPARATION OF COPOLYMERS OF MALEIC ANHYDRIDE AND ALKYL VINYL ETHER

BACKGROUND OF THE INVENTION

It is highly desirable to produce copolymers of maleic anhydride and alkyl vinyl ethers with substantially reduced benzene contents and preferably which are substantially benzene free.

Copolymers of maleic anhydride and alkyl vinyl ether have a variety of important commercial uses, in the medical, cosmetic, pharmaceutical, food and other industries. One important property of the copolymer for these applications is its molecular weight, as commonly measured by its specific viscosity of a 1% (wt./vol.) solution in methyl ethyl ketone at 25° C. For example, U.S. Pat. No. 3,003,988, teaches that a useful denture stabilizing composition is obtained from such copolymers. For many applications, the benzene content of the copolymer is an important property.

Benzene is a recognized human carcinogen. Hence, benzene specifications have become extremely important for personal care products, and benzene contents are continually being reduced. In 1990, the New York State Consumer Protection Bureau, in conjunction with the FDA, announced the results of a study of the benzene content of denture adhesives on the market, and asked manufacturers with products exceeding 10 parts per billion (ppb) of benzene to remove them from the market. This level represents the current limit of detectability of benzene in denture adhesives, and future testing may evolve more sensitive detection methods and more stringent controls on benzene content.

Because benzene is a recognized carcinogen, it thus becomes necessary to manufacture personal care products with reduced benzene levels. One such specialty product in wide use in personal care products is the copolymer of maleic anhydride and alkyl vinyl ether. It is used either directly or as derivative products of the copolymer in denture adhesives, detergent bars, hair sprays, toothpastes, and the like.

Production of interpolymers of methyl vinyl ether and maleic anhydride are generally conducted by dissolving the reactants, along with a free radical initiator, in a material which is a solvent for the reaction mix, which has no undesirable reactions with any component of the reaction mix, and which does not interfere with the free radical polymerization reaction which builds molecular weight. This latter criterion is extremely difficult to meet and the choice of practical solvents is thus restricted. In addition, the material chosen as a solvent for the reaction mix is preferably a nonsolvent for the polymer product formed. The polymer thus becomes a slurry of finely divided particles as formed during the reaction, and can be separated easily from the solvent.

Maleic anhydride-alkyl vinyl ether copolymers have historically been produced in a benzene solvent, as disclosed in U.S. Pat. Nos. 2,782,182 and 3,532,771. Product produced in a benzene solvent is inherently of stable shelf life in terms of viscosity, and exhibits no viscosity degradation when exposed to temperatures of 30 to 90° C. The usual product sold in commerce from this reaction system contains up to 2% benzene, commonly 1.5% benzene, on a weight percent of copolymer. Even extensive drying, at such extreme conditions as to be uneconomic commercially, can only reduce the benzene content of the copolymer to about 0.5% to 1.0% by weight of copolymer. This level far exceeds the acceptable concentration of benzene.

U.S. Pat. No. 4,900,809 discloses a method of removal of benzene from the copolymer, consisting of extraction of the benzene from the copolymer with aromatic solvents, such as toluene. This approach requires high reflux ratios, is costly, it contaminates the copolymer with toluene (a component of gasoline), and still does not reduce benzene levels below about 1 ppm (1000 ppb).

It would be most desirable to identify other solvents than benzene for the conduct of the polymerization of maleic anhydride and alkyl vinyl ether. This would overcome the many disadvantages of extraction of the benzene from the copolymer after it is formed in a benzene solvent. Because of the impact on high molecular weight copolymer production, the identification of a suitable solvent is quite difficult. The use of a methylene chloride solvent for this purpose is disclosed in U.S. Pat. No. 3,632,361. Unfortunately, methylene chloride has also been identified to be a carcinogen.

The use of acetone or ethyl acetate solvents is disclosed in U.S. Pat. No. 4,948,848. This procedure requires a long time period for continuous feed of maleic anhydride dissolved in the solvent, presumably to permit the desired growth in molecular weight. Further, since acetone and ethyl acetate are solvents for the copolymer itself, care must be taken to prevent the dissolution of the copolymer in the solvent by control of the post-reaction operations. In the examples of this patent, toluene was added to the reaction product to maintain the reaction product in a pumpable form. Toluene, of course, exhibits a boiling point very near that of benzene, and is thus not available in a form free of benzene contamination. This patent also discloses that use of high ratios of methyl vinyl ether to maleic anhydride will product high molecular weight copolymer, which is very desirable for many applications.

U.S. Pat. No. 5,047,490 discloses methods of conducting the polymerization only in the presence of alkyl vinyl ether, thereby eliminating the use of any extraneous solvent and thus providing the prospect of extremely high purity copolymers of alkyl vinyl ether and maleic anhydride. They also teach the use of a high ratio of methyl vinyl ether to maleic anhydride, from about 3 to about 20 moles of methyl vinyl ether per mole of maleic anhydride.

Even when following the teachings of U.S. Pat. No. 5,047,490, it has surprisingly been found that the copolymer contains substantial amounts of benzene, perhaps as much as 600 ppb. In these tests, lauryl peroxide was used as a free radical initiator and is expected to be free of benzene by one skilled in the art due to its manufacturing method. Maleic anhydride is now commonly produced by the oxidation of 4 carbon hydrocarbon molecules, and is expected to be free of benzene by one skilled in the art due to its manufacturing method. Alkyl vinyl ethers, and specifically methyl vinyl ether, are commonly produced either by reactions of an alcohol with acetylene or by reaction of alcohol with vinyl acetate. Because of the manufacturing steps used to effectively cleanse the acetylene from benzene and the absence of benzene in vinyl acetate and alcohol, one skilled in the art would expect the alkyl vinyl ether to be substantially free of benzene due to its manufacturing method.

Further, since excess methyl vinyl ether or other solvents used in the copolymerization reaction are often evaporated from the copolymer to produce the dry product, one skilled in the art would expect substantially all of any contaminating benzene to also be distilled over and thence removed from the dried copolymer product. For example, U.S. Pat. No. 5,047,490 uses 3 to 20 moles of methyl vinyl ether per mole of maleic anhydride. The vapor-liquid equilibrium calculations for evaporating a methyl vinyl ether present in an amount of 3 to 20 parts methyl vinyl ether for 1 part copolymer, and which also contains 600 parts of benzene for 1 billion parts of copolymer, would lead one skilled in the art to expect substantially all of the benzene to be contained in the methyl vinyl ether distillate and de minimis benzene to be contained in the dried copolymer. Mass spectrometry-gas chromatographic analyses of the distillate product do not show the presence of benzene and yet the dried copolymer can contain 600 ppb of benzene.

SUMMARY OF THE INVENTION

Accordingly, it is a principal object of the present invention to provide a process for the preparation of copolymers of alkyl vinyl ether and maleic anhydride with substantially reduced benzene contents and preferably which are substantially benzene free.

It is a further object of the present invention to provide a process as aforesaid which is easy to employ commercially and is relatively inexpensive.

Further objects and advantages of the present invention will appear hereinbelow.

In accordance with the present invention, the foregoing objects and advantages are readily obtained.

The present invention is a process for the preparation of copolymers of maleic anhydride and alkyl vinyl ethers with substantially reduced benzene contents and desirably which are substantially benzene free, which comprises: providing alkyl vinyl ether wherein the alkyl group contains from 1 to 5 alkyl groups and is preferably methyl; contacting the ether with activated charcoal wherein the ether to charcoal ratio is preferably from about 1:1 to 5000:1; separating the alkyl vinyl ether from the charcoal to form a charcoal treated alkyl vinyl ether; and reacting together the charcoal treated alkyl vinyl ether and maleic anhydride in the presence of a free radical initiator, said initiator being free from aromatic groups, to form a copolymer of alkyl vinyl ether and maleic anhydride with a substantially reduced benzene content and if desired which are substantially benzene free.

The alkyl vinyl ether is generally intimately contacted with the activated charcoal for at least 15 seconds and the maximum contact time is not critical.

Further features of and advantages of the present invention will appear hereinbelow.

DETAILED DESCRIPTION

The process of the present invention advantageously prepares the aforesaid improved copolymers of alkyl vinyl ether and maleic anhydride by treating of alkyl vinyl ether with activated charcoal followed by copolymerization of the alkyl vinyl ether with maleic anhydride using a polymerization process employing a free radical initiator without aromatic groups and excluding non-reactive solvents containing benzene even in trace amounts.

The instant process first contacts the alkyl vinyl ether with activated charcoal to provide intimate contact therebetween. The alkyl vinyl ether is then separated from the activated charcoal to provide a charcoal treated alkyl vinyl ether which is then reacted together with maleic anhydride in the presence of a free radical initiator which is free from aromatic groups to form the copolymer. If desired, a benzene free solvent is used in the copolymerization reaction or an excess of the ether may be used as solvent.

The reaction temperature is increased to initiate polymerization, thereby forming a suspension of copolymer in the liquid phase in the reactor. Upon completion of the reaction, excess solvent and alkyl vinyl ether are removed, preferably completing the removal cycle by heating under vacuum while agitating the dried polymer. The copolymer obtained therefrom is a fine, white, free-flowing powder, having a specific viscosity in the range of about 0.1 to 5.5, preferably from about 1.5 to 4.5, and still more preferably from 2.5 to 4.0, and is substantially free of benzene.

The alkyl vinyl ether may be contacted with activated charcoal in the vapor phase or in the liquid phase. In a preferred embodiment, vapor phase alkyl vinyl ether is passed through a packed bed of activated charcoal to remove benzene. In another embodiment of the process, maleic anhydride is dissolved in alkyl vinyl ether, and the combined stream is contacted in the liquid phase with activated charcoal to effect benzene removal.

Activated charcoals, also known as activated carbon, are available commercially and are formed by heating a carbonaceous material in the absence of air followed by controlled oxidation by steam or carbon dioxide to increase surface area. Preferred activated charcoals are those exhibiting an internal surface area exceeding 200 $m^2$/gram. Carbon from coconut shells is particularly useful because it is relatively free of impurities, and is hard and attrition-resistant. Treatment of alkyl vinyl ether with the activated charcoal can be performed by other methods, such as providing a slurry of charcoal, wherein the ether to charcoal ratio is from about 1:1 to about 5000:1, depending on the charcoal used.

The alkyl group of the alkyl vinyl ether can have from one to five carbon atoms, and preferably is a methyl group. The molar ratio of alkyl vinyl ether to maleic anhydride is between about 1:1 to 25:1, preferably 3:1 to 10:1 and still more preferably from 5:1 to 9:1. Preferred organic solvents include the alkyl vinyl ether itself; ethyl, propyl or butyl alcohol; acetone; or ethyl acetate, preferably using a stoichiometric excess of the alkyl vinyl ether. When a stoichiometric excess of ether is used as solvent, the ratio of alkyl vinyl ether to maleic anhydride is between about 1.05:1 to 25:1 on a mole ratio, preferably 3:1 to 10:1 and still more preferably from 5:1 to 9:1. For solvents other than alkyl vinyl ether, the weight ratio of the solvent to maleic anhydride is about 0.1:1 to 6:1, preferably 1:1 to 4:1. The free radical initiator is to be free of aromatic groups, and can be peroxy esters, dialkyl peroxides, hydroperoxy esters and the like. The initiator is present in an amount from about 0.001% to 5% by weight on maleic anhydride, and preferably from 0.1% to 2% by weight. The polymerization is conducted at a temperature of about 30° C. to 90° C., and preferably 40° C. to 70° C. and preferably at the pressure of the reactants.

It has been surprisingly found in accordance with the present invention that the resultant copolymers substantially reduced benzene content and one may obtain such copolymers which are substantially benzene free, which as noted hereinabove is a significant advantage.

In accordance with the present invention, one may readily obtain substantially reduced benzene levels on the order of less than 200 ppb, and if desired obtain a substantially benzene free content of less than 10 ppb within the operating parameters of the present invention.

Indeed, it is surprising to find that known processes as discussed hereinabove result in elevated levels of benzene in a copolymer produced from a reaction mix apparently free from benzene. Further, one skilled in the art would expect benzene to be evaporated with the excess solvent, and not to remain preferentially with the copolymer. Still further, if benzene were found, one skilled in the art would not expect the alkyl vinyl ether to be the source of the benzene. Still further, one skilled in the art would not expect an activated charcoal treatment of the alkyl vinyl ether to produce a substantially benzene free, dried copolymer. Still further, since activated charcoal is routinely used to remove ethers and other oxygenates from gaseous and liquid materials desired to be so purified, it is surprising that the alkyl vinyl ether does not saturate the activated charcoal and prevent the adsorption of benzene from an alkyl vinyl ether stream. Indeed, contacting activated charcoal with alkyl vinyl ether produces a very substantial heat release, showing significant adsorption of the ether on the charcoal, which would lead one skilled in the art to expect it to be ineffective for removal of benzene from the ether. Finally, many products used in intimate human contact, such as denture adhesives, require a high molecular weight. A high molecular weight is achieved by use of high methyl vinyl ether levels relative to copolymer, and it is most surprising that these are precisely the conditions that lead to high benzene levels in those copolymers most widely used in intimate human contact.

Without being bound by theory, it appears that the alkyl vinyl ether surprisingly contains trace levels of benzene contamination, even though unexpected to one skilled in the art. Benzene apparently has a very strong affinity for the copolymer, as evidenced by the difficulty in removing benzene by conventional drying techniques. Apparently, the copolymer quantitatively adsorbs the trace levels of benzene present in the reaction mixture. Surprisingly, the combination of trace levels of benzene in the alkyl vinyl ether, the excess use of alkyl vinyl ether above stoichiometric requirements to produce high molecular weight copolymer, and the quantitative adsorption of benzene on the copolymer, all conditions being simultaneously present, lead to the unacceptably high levels of benzene in the copolymer product. Because one skilled in the are would not except each of these conditions to be present, and further would not expect the combination of the three conditions to be simultaneously relevant, and still further would not expect benzene to be adsorbed preferentially on activated charcoal from an alkyl vinyl ether, it would be unexpected to combine alkyl vinyl ether treatment by charcoal with copolymerization of maleic anhydride with alkyl vinyl ether, optionally using a non-reactive solvent which is substantially benzene-free, to produce a substantially benzene-free copolymer of maleic anhydride and alkyl vinyl ether.

The present invention will be more readily apparent from the following example.

The following comparative examples are provided to demonstrate that the polymerization of maleic anhydride with an excess of alkyl vinyl ether results in a copolymer of elevated benzene content, even though benzene cannot be detected in the alkyl vinyl ether used.

The examples which follows the comparative example shows the results of producing a copolymer of maleic anhydride and alkyl vinyl ether which is substantially benzene free, using the methods of the present invention. One skilled in the art may, be routine experimentation, adjust the treatment conditions shown below within the parameters outlined about so that the substantially benzene free content shown therein is reduced even further.

COMPARATIVE EXAMPLE 1

In order to determine the benzene content of copolymer, two samples of copolymer of maleic anhydride and methyl vinyl ether were prepared which were consistent with U.S. Pat. No. 5,047,490. To one glass pressure tube, 2.0 grams of maleic anhydride and 0.0177 grams of lauryl peroxide were charged. To a second glass pressure tube, 2.0 grams of maleic anhydride and 0.0185 grams lauryl peroxide were charged. Both tubes were purged with dry nitrogen and chilled to 0° C.

A new 600 ml glass flask was chilled to 0° C., which had not previously been used and thus was completely free of benzene. From a commercial sample of methyl vinyl ether, a liquid sample was withdrawn directly into this chilled flask. Then, 10.3 grams of this methyl vinyl ether was charged to one of the glass pressure tubes and 10.0 grams of methyl vinyl ether was charged to the other. Both glass pressure tubes were sealed and immersed in a 60° C. water bath. After 60 minutes, both glass pressure tubes were immersed in an ice bath to cool the contents of the tubes. The complete conversion of maleic anhydride was confirmed by testing with triphenylphosphine impregnated filter paper. Both pressure tubes were vented and subjected to vacuum to remove unreacted methyl vinyl ether. A fine white powder copolymer product was recovered from each tube.

These two samples were combined into a single sample and analyzed by an outside laboratory for benzene. a benzene level of 600 ppb was detected in the copolymer product.

COMPARATIVE EXAMPLE 2

A 150 milliliter liquid sample of methyl vinyl ether was withdrawn from a commercial lot of methyl vinyl ether, and sent to an outside laboratory for benzene analysis. The laboratory analysis reported no detectable levels of benzene. Hence, one skilled in the art would not be led to try charcoal treating for benzene reduction in the copolymer, and instead would pursue mechanisms of possible decomposition reactions forming benzene.

EXAMPLE 3

To demonstrate that significant levels of benzne reduction in a copolymer of maleic anhydride and alkyl vinyl ether can be accomplished by the present invention, 2.0 grams of maleic anhydride and 0.0247 grams lauryl peroxide were charged to each of two glass pressure tubes. The tubes were purged with nitrogen and chilled to 0° C. The same commercial samples of maleic anhydride, aluryl peroxide and methyl vinyl ether were employed as in example 1.

In this experiment, 50 grams of Calgon Type CAL granular activated carbon (12×40 mesh particle size) was charged to a new 600 ml flask. The flask was chilled to 0° C. and a 50 ml liquid sample of methyl vinyl ether was added to the flask. The flask was sealed with a stopper and agitated to thoroughly contact the methyl vinyl ether with the activated carbon. The flask was then attached to a condenser. Methyl vinyl ether was evaporated with the flask exposed to an ambient temperature of 25° C. The condenser was maintained at −10° C. by circulating a chilled glycol/water solution. The evaporated methyl vinyl ether was condensed into a second new 600 ml flask maintained at 0° C. This evaporation/condensing step was performed to eliminate any granular activated carbon dust from the methyl vinyl ether. Then, 10.2 grams of the treated methyl vinyl ether was charged to one glass pressure tube and 10.1 grams of the treated methyl vinyl ether to the second glass pressure tube. Both tubes were sealed and immersed in a 60° C. water bath. After 90 minutes, the tubes were removed from the water bath and cooled in an ice bath. Complete conversion of maleic anhydride in each tube was confirmed by testing with triphenylphosphine impregnated filter paper. Unreacted methyl vinyl either was removed from both tubes by venting and subjecting to deep vacuum. A fine white powder copolymer was recovered from each tube.

The copolymer was combined into a single sample and analyzed for benzene by an outside laboratory. The benzene content of the copolymer was determined to be 115 ppb, representing over 80% reduction from the sample prepared with untreated methyl vinyl ether.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the preparation of copolymers of maleic anhydride and alkyl vinyl ethers, which comprises providing alkyl vinyl ether wherein the alkyl group contains from 1 to 5 carbon atoms; contacting the ether with activated charcoal; separating the ether from the charcoal to form a charcoal treated alkyl vinyl ether; and reacting the charcoal treated ether with maleic anhydride in the presence of a free radical initiator, said initiator being free from aromatic groups, to form a copolymer of alkyl vinyl ether and maleic anhydride with reduced levels of benzene.

2. Process according to claim 1 wherein the ether to charcoal ratio is from about 1:1 to 5000:1.

3. Process according to claim 1 wherein the ether is methyl vinyl ether.

4. Process according to claim 1 wherein the ether is intimately contacted with the charcoal for at least 15 seconds.

5. Process according to claim 4 wherein the ether is in the liquid phase.

6. Process according to claim 4 wherein the ether is in the vapor phase.

7. Process according to claim 4 wherein the ether is passed through a packed bed of activated charcoal.

8. Process according to claim 4 wherein the maleic anhydride is dissolved in ether to form a combined stream, and the combined stream in the liquid phase is contacted with activated charcoal.

9. Process according to claim 1 wherein the resultant copolymer has a specific viscosity of from about 0.1 to 5.5.

10. Process according to claim 9 wherein the resultant copolymer has a specific viscosity of from about 1.5 to 4.5.

11. Process according to claim 1 wherein the molar ratio of ether to maleic anhydride is from about 1:1 to 25:1.

12. Process according to claim 11 wherein the molar ratio of ether to maleic anhydride is from about 3:1 to 10:1.

13. Process according to claim 1 wherein the ether and maleic anhydride are contacted together in the absence of non-reactive solvents containing benzene.

14. Process according to claim 13 wherein the ether and maleic anhydride are reacted together in the presence of a benzene free organic solvent.

15. Process according to claim 14 wherein the weight ratio of the organic solvent to maleic anhydride is from about 0.1:1 to 6:1.

16. Process according to claim 15 wherein the weight ratio of the organic solvent to maleic anhydride is from about 1:1 to 4:1.

17. Process according to claim 1 wherein the initiator is present in an amount from about 0.001 to 5% by weight.

18. Process according to claim 17 wherein the initiator is present in an amount from about 0.1 to 2% by weight.

19. Process according to claim 13 wherein the maleic anhydride and ether are reacted together in a stoichiometric excess of ether with a ratio of ether to maleic anhydride being between about 1.05:1 and 25:1 on a mole ratio.

20. Process according to claim 1 wherein the activated charcoal has an internal surface area exceeding 200 m²/gram.

* * * * *